United States Patent [19]
Nishida et al.

[11] Patent Number: 5,747,575
[45] Date of Patent: May 5, 1998

[54] CRYSTALLINE THERMOPLASTIC RESIN COMPOSITION

[75] Inventors: Koji Nishida; Yoshihiro Kurasawa; Kiyoji Takagi; Hironari Sano, all of Yokkaichi, Japan

[73] Assignee: Mitsubishi Chemical Corporation, Tokyo, Japan

[21] Appl. No.: 742,749

[22] Filed: Nov. 1, 1996

[30] Foreign Application Priority Data

Nov. 2, 1995 [JP] Japan ................................. 7-285913

[51] Int. Cl.$^6$ ................................................. C08K 3/34
[52] U.S. Cl. ................................. 524/443; 524/445
[58] Field of Search ................................. 524/443, 445

[56] References Cited

U.S. PATENT DOCUMENTS 4,884,885  12/1989  Usuki et al. ........................ 524/445
5,385,776  1/1995  Maxfield et al. .................... 428/297

*Primary Examiner*—Edward J. Cain
*Attorney, Agent, or Firm*—Oblon, Spivak, McClelland, Maier & Neustadt, P.C.

[57] ABSTRACT

There is provided a crystalline thermoplastic resin composition comprising (a) 100 parts by weight of a crystalline thermoplastic resin and (b) 0.01 to 11 parts by weight of a laminar structure of silicate, said laminar structure of silicate being present in the form of crystal nuclei dispersed at a molecular level in said resin, and having an aspect ratio of at least 20 as represented by a length-to-breadth ratio of said crystal nuclei.

11 Claims, No Drawings

CRYSTALLINE THERMOPLASTIC RESIN COMPOSITION

BACKGROUND OF THE INVENTION

1. Field of the Invention

The present invention relates to a crystalline thermoplastic resin composition which comprises a crystalline thermoplastic resin and a laminar structure of silicate (hereinafter called the laminar silicate) dispersed at a molecular level in said resin.

2. Background Art

So far, crystalline thermoplastic resins have been improved in terms of various properties, especially mechanical and thermal properties, by the incorporation of inorganic fillers therein. It is then known that some inorganic fillers behave effectively as a nucleating agent for crystalline resins. For instance, talc is known to act as a nucleating agent for various crystalline resins to make improvements in the melting points, crystallization, etc., and mechanical and thermal properties thereof. However, the mere incorporation of such inorganic fillers in crystalline resins has proved to be not satisfactory in the effect of improving the properties of the resins.

Further, it has been attempted to use a clay mineral or a sort of inorganic laminar compound as a filler, but much difficulty has been involved in the uniform dispersion thereof in resins by ordinary mixing and kneading techniques due to the occurrence of secondary agglomeration. Thus, the clay mineral is found to have little, if any, nucleating agent effect. JP-A-63-215775 discloses that a polymer is polymerized between the laminae of a clay mineral, and JP-A-6-93133 and JP-A-6-41346 describe that a solution of a clay mineral dispersed in a solvent is mixed with a solution of a thermoplastic resin dissolved in a solvent. However, difficulty is still experienced in the uniform dispersion of the resin and clay mineral. Again in this case, the clay mineral makes no great contribution to improvements in the crystallinity of crystalline resins.

Thus, a crystalline thermoplastic resin composition is still desired, which is remarkably improved in terms of melting point and crystallization as well as mechanical and thermal properties due to the presence of an inorganic laminar compound uniformly dispersed in a crystalline thermoplastic resin as an effective nucleating agent therefor.

SUMMARY OF THE INVENTION

In the background of prior art as mentioned above, the inventors have now found that a thermoplastic resin composition can have a very high nucleating agent effect and so can be significantly improved in terms of mechanical and thermal properties by dispersing a laminar silicate at a molecular level in a thermoplastic resin in the form of crystal nuclei having a high aspect ratio, and have consequently accomplished the present invention.

Thus, the present invention provides a crystalline thermoplastic resin composition comprising (a) 100 parts by weight of a crystalline thermoplastic resin and (b) 0.01 to 11 parts by weight of a laminar silicate, said laminar silicate being present in the form of crystal nuclei dispersed at a molecular level in said resin, and having an aspect ratio of at least 20 as represented by the length-to-breadth ratio of said crystal nuclei.

DETAILED DESCRIPTION OF THE INVENTION

The present invention will now be explained at great length.

Crystalline Thermoplastic Resin (Component) (a)

The crystalline thermoplastic resin usable herein is a resin that can be melted by heating, has a distinctive crystal or molecular structure and non-glassy properties, and has a measurable heat of fusion and shows a definite melting point. The melting point and heat of fusion may be measured by use of a differential scanning calorimeter (DSC: for instance, DSC-11 available from PERKIN-ELMER).

If this calorimeter is used, it is then possible to measure the heat of fusion at a heating rate of 10° C. per minute, for instance. More specifically, a sample is heated to a temperature above its expected melting point, then cooled to 20° C. at a rate of 10° C. per minute, at which it is allowed to stand alone for about 1 minute, and again heated at a rate of 10° C. per minute. The heat of fusion is represented by a constant value found by a heating/cooling cycle test and lying within an experimental error range. The crystalline thermoplastic resin usable herein is thus defined as a resin with the heat of fusion exceeding 1 calorie/gram as measured by this method.

The crystalline thermoplastic resin usable herein may be at least one member selected from the group consisting of polyolefin, polyamide, polyester, polyacetal, halogen-containing thermoplastic resin, polysulfone, etc., among which the polyolefin resin is most preferable.

The polyolefin resin, for instance, may include homopolymers or copolymers of α-olefin(s), and copolymers composed mainly of α-olefin(s) and containing other unsaturated monomer(s) as a subordinate component, if required. The term "copolymer" is here understood to refer to all sorts of copolymers inclusive of block, random, and graft copolymers. These olefin polymers may have been modified by chlorination, sulfonation, carbonylation, etc.

The aforesaid α-olefins, for instance, may include ethylene, propylene, butene-1, pentene-1, hexene-1, heptene-1, and octene-1, and α-olefins having 2 to 8 carbon atoms are preferable because they are easily available. The aforesaid unsaturated monomer, for instance, may include unsaturated organic acids such as (meth)acrylic acid, (meth) acrylic ester, and maleic acid, or their anhydrides.

Exemplary polyolefin resins are low-density polyethylene, medium-density polyethylene, high-density polyethylene, polypropylene, polybutene, and ethylene-propylene block or random copolymers, which may be used in combination of two or more.

Among these crystalline olefin polymers preference is given to, for instance, a crystalline homopolymer of ethylene or propylene, a copolymer containing ethylene or propylene as a main constituent, and a crystalline copolymer of ethylene or propylene with other unsaturated monomer. In particular, the low-, medium- or high-density polyethylene, poly-propylene, and propylene-ethylene block copolymer are more preferable with the high-density polyethylene, polypropylene, and propylene-ethylene block copolymer being most preferable.

These resins have a melt flow rate (MFR; measured at 230° C. under a load of 2.16 kg) lying within the range of preferably 0.01 to 250 g/10 minutes, more preferably 0.05 to 200 g/10 minutes, and most preferably 0.1 to 100 g/10 minutes. Resins, when having too small an MFR value, have difficulty in moldability whereas resins, when having too large an MFR value, are not preferable in view of mechanical strength.

In the present invention, a part (up to 20 mol %) of the polyolefin resin may be replaced by a sensitive derivative of said polyolefin resin. The sensitive derivative is here understood to refer to a polyolefin resin modified by grafting with an unsaturated organic acid or its anhydride (for instance, acrylic acid, maleic acid or itaconic acid, or their anhydrides), or an organic silane compound (for instance, vinyl trimethoxy silane, vinyl triethoxy silane, vinyl triacetoxy silane, γ-methacryloxypropyl trimethoxy silane, or propenyl trimethoxy silane), or an ionomer obtained by the metal ionization of a part of the carboxyl group attached to the graft chain of the polyolefin resin modified by grafting with the aforesaid organic acid or its anhydride. Apart from the aforesaid examples, derivatives having hydrophilic groups introduced therein by graft, block or random copolymerization methods, or substitution reaction, oxidation reaction or other reactions, too, may be used as the sensitive derivatives of polyolefins.

Laminar Silicate (Component) (b)

The laminar silicate usable herein may be exemplified by a laminar philosilicate mineral made up of magnesium silicate or aluminum silicate laminae. More specifically, mention is made of a smectite series of clay minerals such as montmorillonite, saponite, beidellite, nontronite, hectorite, and stevensite as well as mica, talc, vermiculite, and halloysite, which may occur naturally or may otherwise be synthesized. Among these, preference is given to synthesized mica, montmorillonite, and vermiculite.

Preferably, the laminar silicate used may have been swollen with a solvent. The solvent used for the swelling of the laminar silicate is not critical, provided that it is liquid at normal temperature. For instance, use may be made of aromatic hydrocarbons such as benzene, toluene, and xylene; chain and cyclic forms of aliphatic hydrocarbons such as heptane, and cyclohexane; halogenated hydrocarbons such as chlorobenzene, dichlorobenzene, trichlorobenzene, and dichloromethane; ethers such as dioxane, and diethyl ether; ketones such as acetone, cyclohexanone; methyl ethyl ketone, and acetophenone; esters such as ethyl acetate, and propiolactone; nitriles such as acetonitrile, and benzonitrile; alcohols such as methanol, ethanol, propanol, butanol, ethylene glycol, and diethylene glycol; water; and organic solvents such as nitrobenzene, sulfolane, dimethylformamide, and diethyl sulfoxide, which may be used alone or in admixture. The aromatic hydrocarbons, halogenated hydrocarbons, alcohols and water are preferable, and xylene, toluene, dichlorobenzene, trichlorobenzene, methanol, ethanol and water are particularly preferable, among which water is most preferable.

Referring here to the amount of the solvent used for the swelling of the laminar silicate, the weight ratio of laminar silicate to solvent lies in the range of preferably 1:0.5 to 1:100, more preferably 1:2 to 1:80, and most preferably 1:4 to 1:60.

At less than 1:0.5 no sufficient swelling occurs, resulting in a failure in achieving sufficient nucleating agent effect, and at more than 1:100 difficulty is involved in hot-melt kneading.

In the present invention, the interlaminar distance of the swollen laminar silicate is preferably at least 30 Å, more preferably at least 50 Å, much more preferably at least 70 Å, and most preferably at least 90 Å.

At an interlaminar distance less than 30 Å, the nucleating agent effect of the laminar silicate becomes insufficient because its dispersion in the resin becomes non-uniform.

Preferably, the aforesaid laminar silicate should have been treated with a swelling agent, so that the swelling of the laminar silicate with the solvent can be accelerated.

For the aforesaid swelling agent, for instance, ammonium, pyridinium, and sulfonium salts, all belonging to an onium salt having an onium ion group in its molecule, may be used. More specifically, use may be made of swelling agents containing octadecyl ammonium ions, monomethyloctadecyl ammonium ions, dimethyloctadecyl ammonium ions, dodecyl ammonium ions, 6-amino-n-caproic acid ions, and 12-aminododecanoic acid ions.

However, it is to be noted that if the laminar silicate is swollen with water, it is then preferable to make no use of any swelling agent because the untreated laminar silicate is easier to swell.

The term "swelling" used herein is understood to refer to a phenomenon in which the laminar silicate absorbs a solvent to increase in volume, and the "combination preferable for swelling" is understood to indicate a combination of a laminar silicate having a degree of swelling of at least 1 cc/g, preferably 10 to 100 cc/g with a solvent.

The degree of swelling may be measured by various methods. Typically, it can be found from the ratio between the volume of a laminar silicate measured by the sedimentation volume method (see "Clay Handbook", p. 513) and the weight of the laminar silicate upon oven-dried. If the laminar silicate is too largely swollen with a solvent, the degree of swelling thereof cannot then be measured because it is subjected to ultra-dispersion in the solvent, and so does not settle down by gravitation. Of course in this case, too, the laminar silicate that can swell very well is used in combination with a solvent.

Compositional Ratio of Constituents

The amount of the laminar silicate (component (b)) used lies within the range of preferably 0.01 to 11 parts by weight, more preferably 0.02 to 9 parts by weight, and most preferably 0.03 to 7 parts by weight per 100 parts by weight of the crystalline thermoplastic resin (component (a)).

When the amount of the laminar silicate (component (b)) used is below 0.01 part by weight per 100 parts by weight of the crystalline thermoplastic resin (component (a)), no satisfactory nucleating agent effect is achievable. At more than 11 parts by weight, on the other hand, problems arise in terms of moldability and appearance.

Morphology of Resin Composition

According to the present invention, the laminar silicate is dispersed at a molecular level in the resin composition, and so exists as crystal nuclei in the resin composition. The crystal nuclei have a length-to-breadth or aspect ratio of at least 20, preferably at least 30, and more preferably at least 40. Crystal nuclei having a maximum aspect ratio of about 80, or even about 200, may be achievable.

By the observation of a molded or otherwise formed article under an electron microscope, the presence and size of the crystal nucleus may be confirmed. The formed article is first dyed with ruthenium tetraoxide or osmium tetraoxide to clarify the crystal structure thereof. Then, a very thin section cut out the article is observed under a transmission electron microscope. As a result, it would be found that in addition to a bulk form of dispersed laminar silicate there are a streak form of molecularly dispersed crystal nuclei. The aspect ratio of the crystal nuclei may be found by subjecting electron microphotographs to image processing, followed by statistical analysis.

At an aspect ratio less than 20 the nucleating agent effect becomes slender.

In the present invention, it is preferable that crystal lamellae grow from the aforesaid crystal nuclei in a vertical direction. It is also desired that the thickness of the aforesaid lamellae is larger than. that found with no addition of the leminar silicate by a factor of preferably at least 1.1, more preferably at least 1.2, and most preferably at least 1.3.

According to the present invention, the crystal nuclei in the end composition preferably have a length of 0.002 to 5 µm, more preferably 0.05 to 1 µm, and most preferably 0.4 to 0.8 µm. The crystal nuclei preferably have a thickness of 30 to 1,000 Å, more preferably 50 to 500 Å, and most preferably 100 to 200 Å. Further, the interlaminar distance of the crystal nuclei is preferably at least 20 Å.

Additional Components

Other additional components may be added to the resin composition according to the present invention. For instance, the resin composition may contain non-crystalline thermoplastic resins, known antioxidants, weather resistance improvers, other nucleators, flame retardants, impact resistance improvers, plasticizers, and fluidity improvers. For improvements in rigidity, heat resistance, dimensional stability and the like, the addition of organic, and inorganic fillers other than the laminar silicate, and reinforcing agents, especially glass fiber, potassium titanate, calcium carbonate, and silica is effective. For practical applications, various coloring agents, and dispersants for them may also be used, all well known in the art.

Preparation of Resin Composition

Various preparation methods may be used to obtain a resin composition containing the crystalline thermoplastic resin or component (a) and the laminar silicate or component (b) according to the present invention. For instance, use may be made of a method of polymerizing the laminar silicate swollen with a monomer, a method of subjecting the crystalline thermoplastic resin and laminar silicate to melt-kneading, and a method of mixing the crystalline thermoplastic resin and laminar silicate together in solution. However, it is preferable to subject the crystalline thermoplastic resin and laminar silicate to melt-kneading, using a kneading machine.

In the present invention, ordinary kneading machines practically used for thermoplastic resins may be used for kneading purposes. For instance, single- or multi-screw kneading extruders, rolls, and Banbury mixers may be used.

In the present invention, it is preferable to provide a kneading machine with a vent port designed to be kept under reduced pressure during melt-kneading. The kneading machine should be such that the resin melts partly at a front stage of the vent port, and so provides sealing under reduced pressure. It is then preferable that, if possible, the resin melts just before reaching the vent port. This is because when the resin in the kneading machine is maintained for an extended period of time in a molten state until it reaches the vent port, its impact resistance drops.

A vacuum device connected directly to the vent port may be regulated in terms of ability depending on the degree of reduced pressure of the vent port, and so every vacuum device may be used to this end.

The vent port pressure is preferably up to 200 torr, more preferably up to 100 torr, and most preferably up to 50 torr. At a vent port pressure exceeding 200 torr, heat resistance and appearance upon molded or otherwise formed become unsatisfactory.

Referring to the kneading conditions in the present invention, it is desired that the temperature of the resin during melt-kneading be higher than the melting point measured with the aforesaid differential scanning calorimeter by preferably 2° to 30° C., more preferably 5° to 25° C., and most preferably 10° to 20° C.

It is also desired that the average residence time of the resin during melt-kneading be preferably 3 to 10 minutes, more preferably 3 to 7 minutes, and most preferably 4 to 6 minutes.

The solvent content of the final composition is preferably up to 1% by weight, more preferably up to 0.9% by weight, and most preferably up to 0.5% by weight. At a solvent content exceeding 1% by weight, heat resistance and appearance become worse.

Referring to the order of kneading, all the components may be kneaded together at the same time. Alternatively, a pre-kneaded blend may be kneaded. Still alternatively, the individual components may be successively fed to an extruder machine in operation for kneading. Especially when a laminar silicate/solvent mixture is liquid by nature, it is preferable to use a liquid adding pump to feed it to the extruder in operation.

The shear rate of the extruder is preferably at least 200 sec$^{-1}$, more preferably at least 300 sec$^{-1}$, much more preferably at least 400 sec$^{-1}$, and most preferably at least 500 sec$^{-1}$.

Methods of obtaining molded or otherwise formed articles from the resin composition prepared as mentioned above are not critical. In other words, use may be made of molding or forming methods ordinarily used for thermoplastic resins, i.e., injection molding, blow molding, extrusion, sheet forming, thermoforming, rotational molding, laminating, and pressing, among which preference is given to injection molding, blow molding, extrusion, and sheet forming with the injection molding being most preferred.

The present invention will now be explained more illustratively with reference to the following examples and comparative examples.

[I] Raw Materials

Given below are the components used.

Crystalline thermoplastic resin (component (a))

(a-1) Polyamide 6 (available form Mitsubishi Enpura Co., Ltd. under the trade name of Novamid 1020)

(a-2) Polypropylene (available from Mitsubishi Chemical Industries, Ltd. under the trade name of Noprene TA8)

(a-3) Polybutylene terephthalate (available from Mitsubishi Enpura Co., Ltd. under the trade name of Novadule 5010)

Non-crystalline thermoplastic resin

PPE: Polyphenylene ether (available from Nippon Polyether Co., Ltd., and having an intrinsic viscosity of 0.40 dl/dg)

PC: Polycarbonate (available from Mitsubishi Enpura Co., Ltd. under the trade name of Novalex 7025A)

Laminar Silicate (component (b))

(b-1) Synthesized mica (available from Corp Chemical Co., Ltd. under the trade name of ME 100; and untreated with a swelling agent)

(b-2) Synthesized mica (available from Corp Chemical Co., Ltd. under the trade name of MAE; and treated with a swelling agent (dimethyldistearyl ammonium salt)

Talc: available from Fuji Talc Co., Ltd. under the trade name of KT 300

Other additional components

MAH: Commercially available maleic anhydride (of reagent grade)

SEPS: Hydrogenated styrene-isoprene block copolymer (available from Kuraray Co., Ltd. under the trade name of 2104)

MMPP: Polypropylene modified with maleic anhydride (available from Mitsubishi Chemical Industries, Ltd.)

PEP36: Bis(2,6-di-tert-butyl-4-methylphenyl) pentaerythritol diphosphite (available from Asahi Denka Co., Ltd.)

Solvent for swelling

Xylene: Commercially available xylene (of reagent grade)

Water: Pure water

[II] Measuring Methods

For the purpose of estimation, various physical values and properties were measured as mentioned below. The results are reported in Tables 1 to 4.

(1) Morphology of dispersed crystal nuclei

Using an ultramicrotome, a very thin section was prepared from a molded article, and then observed under a transmission electron microscope (available from JEOL, Ltd. under the trade name of JEM 2010). As a result, it could be confirmed that the molded resin article contains crystal nuclei of laminar silicate dispersed at a molecular level therein. By analyzing microphotographs with an image analyzer (available from Nippon Avionisc Co., Ltd. under the trade name of Spica 2), the aspect ratio was found from the ratio between the sizes of the crystal nuclei present in the resin, as measured in their thickness direction and a direction at right angles therewith. To this end, more than 100 crystal nuclei dispersed in the resin were measured, and the measurements were number-averaged.

(2) Modulus in flexure

The modulus in flexure was measured using an Instron tester according to ISO R178-1974 Procedure 12 (JIS K7203).

(3) Heat distortion temperature

The heat distortion temperature was measured under a load of 18.6 kg, using an HDT tester (available from Toyo Seiki Seisakusho Co., Ltd.) according to JIS K7207.

EXAMPLE 1

At the proportion shown in Table 1, component (b) and the solvent were well mixed under agitation using a super-mixer so that component (b) was swollen with the solvent.

Then, the thus swollen laminar silicate was well mixed with the crystalline thermoplastic resin at the proportion shown in Table 1, using a super-mixer.

Subsequently, the resulting mixture was subjected to hot-melt kneading, using a twin-screw extruder (available from Nippon Seikosho Co., Ltd. under the trade name of TEX44) at a preset temperature of 230° C. and a 350 screw rpm. The hot-melt kneading was effected at a vent port located downstream of the kneading portion under reduced pressure (a vent port pressure of 10 torr) to obtain a resin composition, which was in turn pelletized.

Using an in-line screw type of injection extruder (available from Nippon Seikosho Co., Ltd. under the trade name of J100), the aforesaid pellet of the resin composition was subjected to injection molding at a cylinder temperature of 260° C. and a mold cooling temperature of 60° C. to thereby obtain a specimen.

It is here to be noted that the pellet was injection-molded just after dried at 0.1 mmHg and 80° C. for 48 hours in a vacuum drier. The specimen was placed in a desiccator just upon injection molding, and allowed to stand therein at 23° C. for 4 to 6 days for estimation testing. The results are reported in Table 1.

EXAMPLE 2

The same operation as in Example 1 was performed, with the exception that polypropylene was used as the crystalline resin, and the twin-screw extruder was preset at a temperature of 180° C., the cylinder temperature of the injection molding machine at 220° C., and the mold cooling temperature at 40° C. The results are reported in Table 1.

EXAMPLE 3

The same operation as in Example 2 was done, with the exception that water was used in place of xylene. The results are reported in Table 1.

The thus obtained crystalline thermoplastic resin composition was observed under an electron microscope at 80,000 magnifications. As a result, it could be observed that there are an approximately linear form of several parallel white-line extensions (crystal nuclei having an aspect ratio of about 40) between which there are a multiplicity of white-line streaks (crystal lamellae) extending in a vertical direction to said white-line extensions. It was thus found that the crystal lamella grow vertically from the crystal nuclei.

Observation under an electron microscope reveals that the thickness of the crystal lamella is larger than that of the resin composition obtained in Comparative Example 1 (to be described later) by a factor of about 20,000.

EXAMPLE 4

At the proportion shown in Table 1 component (b) and water were well mixed together under agitation so that component (b) was swollen with the solvent.

Then, while the resin component was subjected to hot-melt kneading under such kneading conditions that the preset temperature was 180° C. and the screw rpm was 350 rpm using a two-screw extruder (available from Nippon Seikosho Co., Ltd. under the trade name of TEX44), the laminar silicate formulated and swollen at the aforesaid step was fed directly to the kneading portion by means of a pump for hot-melt kneading at a vent port located downstream of the kneading portion, which was at a pressure of 10 torr, thereby obtaining a resin composition, which was then pelletized.

EXAMPLE 5

Pelletizing was done under the same conditions as in Example 4 with the exception that the components were used at the proportions shown in Table 1.

Then, the obtained composition was blended dry with polypropylene (available from Mitsubishi Chemical Industries, Ltd. under the trade name of Noprene MA8) at a weight ratio of 50:50, and the blend was molded in the same manner as in Example 4 for estimation. The results are reported in Table 1.

EXAMPLE 6

Example 1 was substantially followed with the exception that polyphenylene ether was used as the non-crystalline resin with maleic anhydride added thereto. The results are reported in Table 2.

EXAMPLE 7

Example 4 was substantially followed with the exception that polyphenylene ether was as the non-crystalline resin with a styrene type copolymer or SEPS added thereto. The results are reported in Table 2.

EXAMPLE 8

Example 2 was substantially followed with the exception that polybutylene terephthalate was used as the crystalline resin and polycarbonate as the non-crystalline resin.

EXAMPLE 9

Example 2 was substantially followed with the exception that polybutylene terephthalate was used as the crystalline resin, and polyphenylene ether was used as the non-crystalline resin with a phosphite (available from Asahi Denka Co., Ltd. under the trade name of PEP36) added thereto. The results are reported in Table 2.

EXAMPLE 10

Example 2 was substantially followed with the exception that polyamide 6 and polypropylene were used as the crystalline resin with maleic anhydride-modified polypropylene added thereto. The results are reported in Table 2.

EXAMPLE 11

Example 3 was substantially followed with the exception that polyamide 6 and polypropylene were used as the crystalline resin with maleic anhydride-modified polypropylene added thereto. The results are reported in Table 2.

COMPARATIVE EXAMPLE 1

Example 1 was substantially followed with the exception that talc was used in place of the laminar silicate and no solvent was used. The results are reported in Table 3.

As in Example 3, the obtained crystalline thermoplastic resin composition was observed under an electron microscope at 80,000 magnifications. It was consequently noted that some streak forms of crystal lamellae can be sporadically observed, but no crystal nuclei having such a high aspect ratio as in Example 3 cannot be found.

It was also noted that the thickness of the crystal lamellae was about half that of the crystalline thermoplastic resin composition obtained in Example 3.

COMPARATIVE EXAMPLE 2

Example 2 was substantially followed with the exception that neither the laminar silicate nor the solvent was added. The results are reported in Table 3.

COMPARATIVE EXAMPLE 3

Example 3 was substantially followed with the exception that no solvent was used. The results are reported in Table 3.

COMPARATIVE EXAMPLE 4

Example 3 was substantially followed with the exception that the solvent was used in the amount shown in Table 3. The results are reported in Table 3.

COMPARATIVE EXAMPLE 5

Example 4 was substantially followed with the exception that the solvent was used in the amount shown in Table 3. Melt-kneading could not be conducted successfully.

COMPARATIVE EXAMPLE 6

Example 7 was substantially followed with the exception that talc was used in place of the laminar silicate and water. The results are reported in Table 4.

COMPARATIVE EXAMPLE 7

Comparative Example 6 was substantially followed with the exception that no talc was used. The results are reported in Table 4.

COMPARATIVE EXAMPLE 8

Example 7 was substantially followed with the exception that as the laminar silicate synthesized mica (MAE) treated with the swelling agent was used in place of the synthesized mica (ME100) untreated with the swelling agent, with no use of any solvent. The results are reported in Table 4.

COMPARATIVE EXAMPLE 9

Example 7 was substantially followed with the exception that no solvent was used. The results are reported in Table 4.

COMPARATIVE EXAMPLE 10

Example 3 was substantially followed with the exception that kneading was done under such conditions that the temperature of the resin in the kneading machine was higher than the melting point of the crystalline thermoplastic resin or polypropylene by 105° C., and with such a throughput that the average residence time was 1 minute. The results are reported in Table 4.

COMPARATIVE EXAMPLE 11

Example 3 was substantially followed with the exception that kneading was done under such conditions that the temperature of the resin in the kneading machine was higher than the melting point of the crystalline thermoplastic resin or polypropylene by 35° C., and with such a throughput that the average residence time was 10 minutes. The results are reported in Table 4.

TABLE 1

| | Examples | | | | |
|---|---|---|---|---|---|
| | 1 | 2 | 3 | 4 | 5 |
| Components (parts by weight) | | | | | |
| Crystalline thermoplastic resin (a) | a-1<br>100 | a-2<br>100 | a-2<br>100 | a-2<br>100 | a-2<br>100 |
| Crystalline thermoplastic resin other than (a) | | | | | |
| Non-crystalline thermoplastic resin | | | | | |
| Laminar silicate (b) | b-2<br>0.5 | b-2<br>0.5 | b-1<br>0.5 | b-1<br>0.5 | b-1<br>1 |
| Solvent | xylene<br>1.5 | xylene<br>1.5 | water<br>1.5 | water<br>10 | water<br>20 |
| Other components | | | | | |
| Kneading Conditions | | | | | |
| Resin temperature (°C.) | 240 | 170 | 165 | 162 | 160 |
| Residence time (min.) | 4 | 4 | 5 | 6 | 6 |
| Morphology of Crystal Nuclei | | | | | |
| Length (μm) | 0.5 | 0.7 | 0.8 | 0.8 | 0.8 |
| Thickness (Å) | 200 | 200 | 200 | 160 | 160 |
| Interlaminar distance (Å) | ≧20 | ≧20 | ≧20 | ≧20 | ≧20 |
| Aspect ratio | 25 | 35 | 40 | 50 | 50 |
| Physical Properties | | | | | |
| Modulus in flexure (MPa) | 2,600 | 1,300 | 1,400 | 1,500 | 1,500 |

TABLE 1-continued

|  | Examples |  |  |  |  |
|---|---|---|---|---|---|
|  | 1 | 2 | 3 | 4 | 5 |
| Heat distortion temperature (°C.) | 70 | 72 | 73 | 75 | 75 |

TABLE 2

|  | Examples |  |  |  |  |  |
|---|---|---|---|---|---|---|
|  | 6 | 7 | 8 | 9 | 10 | 11 |
| Components (parts by weight) | | | | | | |
| Crystalline thermoplastic resin (a) | a-1 60 | a-2 60 | a-3 60 | a-3 60 | a-1 60 | a-1 20 |
| Crystalline thermoplastic resin other than (a) | | | | | a-2 30 | a-2 70 |
| Non-crystalline thermoplastic resin | PPE 40 | PPE 40 | PC 40 | PPE 40 | | |
| Laminar silicate (b) | b-2 0.5 | b-1 0.5 | b-2 0.5 | b-2 0.5 | b-2 0.5 | b-1 0.5 |
| Solvent | xylene 1.5 | water 10 | xylene 1.5 | xylene 1.5 | xylene 1.5 | water 1.5 |
| Other components | MAH 0.5 | SEPS 10 | | PEP36 1 | MMPP 10 | MMPP 10 |
| Kneading Conditions | | | | | | |
| Resin temperature (°C.) | 245 | 180 | 230 | 238 | 232 | 215 |
| Residence time (min.) | 4 | 5 | 4 | 5 | 4 | 4 |
| Morphology of Crystal Nuclei | | | | | | |
| Length (μm) | 0.5 | 0.7 | 0.6 | 0.6 | 0.6 | 0.8 |
| Thickness (Å) | 240 | 185 | 270 | 260 | 230 | 180 |
| Interlaminar distance (Å) | ≧20 | ≧20 | ≧20 | ≧20 | ≧20 | ≧20 |
| Aspect ratio | 21 | 38 | 22 | 23 | 26 | 45 |
| Physical Properties | | | | | | |
| Modulus in flexure (MPa) | 2,500 | 1,800 | 2,300 | 2,600 | 2,300 | 1,800 |
| Heat distortion temperature (°C.) | 120 | 100 | 110 | 110 | 70 | 70 |

TABLE 3

|  | Comparative Examples |  |  |  |  |
|---|---|---|---|---|---|
|  | 1 | 2 | 3 | 4 | 5 |
| Components (parts by weight) | | | | | |
| Crystalline thermoplastic resin (a) | a-1 100 | a-2 100 | a-2 100 | a-2 100 | a-2 100 |
| Crystalline thermoplastic resin other than (a) | | | | | |
| Non-crystalline thermoplastic resin | | | | | |
| Laminar silicate (b) | talc | | b-1 | b-1 | b-1 |
| | 0.5 | | 0.5 | 0.5 | 0.5 |
| Solvent | | | | water 0.1 | water 60 |
| Other components | | | | | |
| Kneading Conditions | | | | | |
| Resin temperature (°C.) | 252 | 180 | 185 | 180 | 155 |
| Residence time (min.) | 4 | 4 | 4 | 4 | 10 |
| Morphology of Crystal Nuclei | | | | | |
| Length (μm) | — | — | 0.5 | 0.5 | — |
| Thickness (Å) | — | — | 2,500 | 1,000 | — |
| Interlaminar distance (Å) | — | — | ≧20 | ≧20 | — |
| Aspect ratio | — | — | 2 | 5 | — |
| Physical Properties | | | | | |
| Modulus in flexure (MPa) | 2,400 | 1,100 | 1,100 | 1,200 | — |
| Heat distortion temperature (°C.) | 68 | 63 | 64 | 66 | — |

TABLE 4

|  | Comparative Examples |  |  |  |  |  |
|---|---|---|---|---|---|---|
|  | 6 | 7 | 8 | 9 | 10 | 11 |
| Components (parts by weight) | | | | | | |
| Crystalline thermoplastic resin (a) | a-2 60 | a-2 60 | a-2 60 | a-2 60 | a-2 100 | a-2 100 |
| Crystalline thermoplastic resin other than (a) | | | | | | |
| Non-crystalline thermoplastic resin | PPE 40 | PPE 40 | PPE 40 | PPE 40 | | |
| Laminar silicate (b) | talc 0.5 | | b-2 0.5 | b-1 0.5 | b-1 0.5 | b-1 0.5 |
| Solvent | | | | | water 1.5 | water 1.5 |
| Other components | SEPS 10 | SEPS 10 | SEPS 10 | SEPS 10 | | |
| Kneading Conditions | | | | | | |
| Resin temperature (°C.) | 200 | 200 | 200 | 200 | 260 | 190 |
| Residence time (min.) | 4 | 4 | 4 | 4 | 1 | 10 |
| Morphology of Crystal Nuclei | | | | | | |
| Length (μm) | — | — | 0.02 | 0.01 | 10 | 8 |
| Thickness | — | — | 50 | 50 | 200 | 100 |

TABLE 4-continued

| | Comparative Examples | | | | | |
|---|---|---|---|---|---|---|
| | 6 | 7 | 8 | 9 | 10 | 11 |
| (Å) Interlaminar distance (Å) | — | — | ≧20 | ≧20 | ≧20 | ≧20 |
| Aspect ratio | — | — | 4 | 2 | 5 | 8 |
| Physical Properties | | | | | | |
| Modulus in flexure (MPa) | 1,300 | 1,200 | 1,300 | 1,250 | 1,100 | 1,150 |
| Heat distortion temperature (°C.) | 80 | 75 | 77 | 75 | 63 | 64 |

What is claimed is:

1. A crystalline thermoplastic resin composition comprising (a) 100 parts by weight of a crystalline thermoplastic resin and (b) 0.01 to 11 parts by weight of a laminar structure of silicate, wherein said laminar structure of silicate is present in the form of crystal nuclei dispersed at a molecular level in said resin, having a thickness of 30 to 1,000 Å and having an aspect ratio of at least 20 as represented by a length-to-breadth ratio of said crystal nuclei, and wherein crystalline lamellae grow from said crystal nuclei in a vertical direction, said composition being obtained by melt-kneading said crystalline thermoplastic resin and said laminar structure of silicate, said laminar of structure of silicate having been swollen with a solvent.

2. The crystalline thermoplastic resin composition according to claim 1, wherein said crystalline thermoplastic resin is a polyolefin resin.

3. The crystalline thermoplastic resin composition according to claim 1, wherein the interlaminar distance of said laminar structure of silicate is at least 20 Å.

4. The crystalline thermoplastic resin composition according to claim 1, wherein said solvent is water and/or an organic solvent.

5. The crystalline thermoplastic resin composition according to claim 1, wherein said laminar structure of silicate has been treated with a swelling agent.

6. The crystalline thermoplastic resin composition according to claim 5, wherein said swelling agent is an onium salt containing an onium ion group in the molecule.

7. The crystalline thermoplastic resin composition according to claim 1, wherein the melt-kneading is conducted at a resin temperature higher than a melting point thereof by 2° to 30° C. for 3 to 10 minutes.

8. The crystalline thermoplastic resin composition according to claim 3, wherein said interlaminar distance of said laminar structure of silicate is at least 30 Å.

9. The crystalline thermoplastic resin composition according to claim 8, wherein said interlaminar distance of said laminar structure of silicate is at least 50 Å.

10. The crystalline thermoplastic resin composition according to claim 9, wherein said interlaminar distance of said laminar structure of silicate is at least 70 Å.

11. The crystalline thermoplastic resin composition according to claim 10, wherein said interlaminar distance of said laminar structure of silicate is at least 90 Å.

* * * * *